(12) United States Patent
Gillen (10) Patent No.: US 10,625,542 B2
(45) Date of Patent: *Apr. 21, 2020

(54) TIRE PRESSURE MANAGEMENT SYSTEM AND METHOD OF DECREASING TIRE PRESSURE

(71) Applicant: DANA HEAVY VEHICLE SYSTEMS GROUP, LLC, Maumee, OH (US)

(72) Inventor: Kurt P. Gillen, Perrysburg, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 105 days.

This patent is subject to a terminal disclaimer.

(21) Appl. No.: 15/568,613

(22) PCT Filed: Apr. 25, 2016

(86) PCT No.: PCT/US2016/029156
§ 371 (c)(1),
(2) Date: Oct. 23, 2017

(87) PCT Pub. No.: WO2016/176137
PCT Pub. Date: Nov. 3, 2016

(65) Prior Publication Data
US 2018/0104993 A1    Apr. 19, 2018

Related U.S. Application Data

(60) Provisional application No. 62/153,183, filed on Apr. 27, 2015.

(51) Int. Cl.
*B60C 23/00* (2006.01)
(52) U.S. Cl.
CPC .......... *B60C 23/003* (2013.01); *B60C 23/008* (2013.01)

(58) Field of Classification Search
CPC ...... B60C 23/00; B60C 23/003; B60C 23/008
See application file for complete search history.

(56) References Cited

U.S. PATENT DOCUMENTS

| 4,431,043 A | 2/1984 | Goodell |
| 4,470,506 A | 9/1984 | Goodell |

(Continued)

FOREIGN PATENT DOCUMENTS

| DE | 2630511 | 1/1978 |
| DE | 102008062072 | 6/2010 |

(Continued)

OTHER PUBLICATIONS

European Patent Office, International Search Report and Written Opinion issued in international application No. PCT/U2016/029156, dated Jun. 28, 2016, 10 pages.

*Primary Examiner* — Jason R Bellinger
(74) *Attorney, Agent, or Firm* — McCoy Russell LLP (57) ABSTRACT

A tire pressure management system includes a wheel valve. The wheel valve is in fluid communication with a wheel assembly. A supply valve assembly is selectively in fluid communication with the wheel valve through a fluid control circuit. The supply valve assembly permits fluid communication between a source of pressurized air and the fluid control circuit. A control valve assembly is selectively in fluid communication with the wheel valve through the fluid control circuit. The control valve assembly permits fluid communication between the source of pressurized air and the fluid control circuit or between the fluid control circuit and atmosphere.

20 Claims, 2 Drawing Sheets

(56) References Cited

U.S. PATENT DOCUMENTS

| | | |
|---|---|---|
| 4,641,698 A | 2/1987 | Bitonti |
| 4,678,017 A | 7/1987 | Schultz |
| 4,744,399 A | 5/1988 | Magnuson |
| 4,782,878 A | 11/1988 | Mittal |
| 4,862,938 A | 9/1989 | Mittal |
| 4,895,199 A | 1/1990 | Magnuson |
| 5,141,589 A | 8/1992 | Mittal |
| 5,540,268 A | 7/1996 | Mittal |
| 5,587,698 A | 12/1996 | Genna |
| 5,647,927 A | 7/1997 | Mason |
| 6,209,350 B1 | 4/2001 | Kimble |
| 6,427,714 B2 | 8/2002 | Freigang |
| 6,561,017 B1 | 5/2003 | Claussen |
| 6,604,414 B1 | 8/2003 | Claussen |
| 6,758,088 B2 | 7/2004 | Claussen |
| 6,865,930 B1 | 3/2005 | Claussen |
| 6,943,673 B2 | 9/2005 | Skoff |
| 7,051,585 B2 | 5/2006 | Claussen |
| 7,079,047 B2 | 7/2006 | Boulot |
| 7,434,455 B2 | 10/2008 | Alff |
| 7,437,920 B2 | 10/2008 | Beverly |
| RE41,756 E | 6/2010 | Claussen |
| 8,136,561 B2 | 3/2012 | Sandoni |
| 9,278,587 B2 | 3/2016 | Honig |
| 9,296,264 B2 | 3/2016 | Mozingo |
| 9,493,042 B2 | 11/2016 | Gillen |
| 10,214,059 B2 * | 2/2019 | Gillen ............... B60C 23/003 |
| 2011/0308637 A1 | 12/2011 | Tsiberidis |
| 2012/0059546 A1 | 3/2012 | Wilson |
| 2012/0138826 A1 | 6/2012 | Morris |
| 2014/0224399 A1 | 8/2014 | Mozingo |
| 2018/0229558 A1 * | 8/2018 | Blessing ............ B60C 23/003 |
| 2018/0236826 A1 * | 8/2018 | Blessing ............ B60C 23/003 |

FOREIGN PATENT DOCUMENTS

| | | |
|---|---|---|
| EP | 0164916 | 12/1985 |
| GB | 2262921 | 7/1993 |
| WO | 2014151418 | 9/2014 |

* cited by examiner

TIRE PRESSURE MANAGEMENT SYSTEM AND METHOD OF DECREASING TIRE PRESSURE

CROSS-REFERENCE TO RELATED APPLICATION

This application claims the benefit, under 35 U.S.C. 365, of PCT application no. PCT/US2016/029156, which was filed Apr. 25, 2016, and claims the benefit, under 35 U.S.C. 119(e), of the provisional U.S. patent application which was granted Ser. No. 62/153,183 and filed on Apr. 27, 2015, the entire disclosure of which is hereby incorporated by reference.

BACKGROUND OF THE INVENTION

The invention relates to a tire pressure management system. More particularly, the invention relates to a tire pressure management system and a method of decreasing tire pressure.

Certain types of vehicles such as, for example, commercial vehicles require that the tire pressure of their wheel assemblies be periodically adjusted for optimal performance. Tire pressure management systems such as, for example, central tire inflation systems can be utilized to manually and/or automatically adjust the pressure within one or more wheel assemblies. Typically, in order to determine when an adjustment is necessary and to avoid overinflation or underinflation, the tire pressure is measured. If, after measuring the tire pressure, it is determined that the tire pressure of a particular tire needs to be decreased, then the tire pressure management system enables the tire pressure decrease.

Current tire pressure management systems capable of decreasing tire pressure are limited by cost, complexity and the rate at which the tire pressure can be decreased. Therefore, it would be desirable to provide a system and method which are less expensive and less complex than those known and that can decrease the tire pressure quickly.

BRIEF SUMMARY OF THE INVENTION

Embodiments of a tire pressure management system are provided.

In an embodiment, the tire pressure management system comprises a wheel valve. The wheel valve is in fluid communication with a wheel assembly. A supply valve assembly is selectively in fluid communication with the wheel valve via a fluid control circuit. The supply valve assembly permits fluid communication between a source of pressurized air and the fluid control circuit. A control valve assembly is selectively in fluid communication with the wheel valve via the fluid control circuit. The control valve assembly permits fluid communication between the source of pressurized air and the fluid control circuit or between the fluid control circuit and atmosphere.

Embodiments of a method for decreasing tire pressure are provided.

In an embodiment, the method for decreasing tire pressure comprises providing a wheel assembly that houses pressurized air. A wheel valve is provided. The wheel valve is in fluid communication with the wheel assembly. The wheel valve is operable from an open position to a closed position. A supply valve assembly is provided. The supply valve assembly is selectively in fluid communication with the wheel valve via a fluid control circuit. A control valve assembly is provided. The control valve assembly is selectively in fluid communication with the wheel valve via the fluid control circuit. A deflate member is provided. The deflate member is in fluid communication with the control valve assembly and is selectively in fluid communication with the wheel valve. A target tire pressure is selected. If a pressure of the pressurized air in the wheel assembly is greater than the target tire pressure, then the pressure of the pressurized air in the wheel assembly is decreased by directing a flow of pressurized air from the wheel assembly through the wheel valve, control valve assembly, and deflate member.

BRIEF DESCRIPTION OF THE VIEWS OF THE DRAWING

The above, as well as other advantages of the present invention will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific assemblies, articles and features illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise. Also, although they may not be, like elements found in the aforementioned embodiments may be referred to with like reference numerals within this section of the application.

A tire pressure management system and a method of decreasing tire pressure are described herein.

Preferably, the tire pressure management system is a central tire inflation system (CTIS). The tire pressure management system is provided on a vehicle (not depicted). A preferred type of vehicle is a commercial vehicle. Commercial vehicles are known in the art. However, the system and method described herein may also have applications in vehicles for both light and heavy duty and for passenger and off-highway vehicles. Furthermore, it would be understood by one of ordinary skill in the art that the system and method could have industrial, locomotive, military and aerospace applications. Also, it should be appreciated that the system may be utilized and the method may be practiced prior to or during operation of the vehicle.

The tire pressure management system and method will be described in connection with a fluid. For the purposes of describing the system and method, the fluid will hereinafter be referred to as air. However, alternative fluids are capable of being utilized in the tire pressure management system and in practicing the method.

Figure 1:
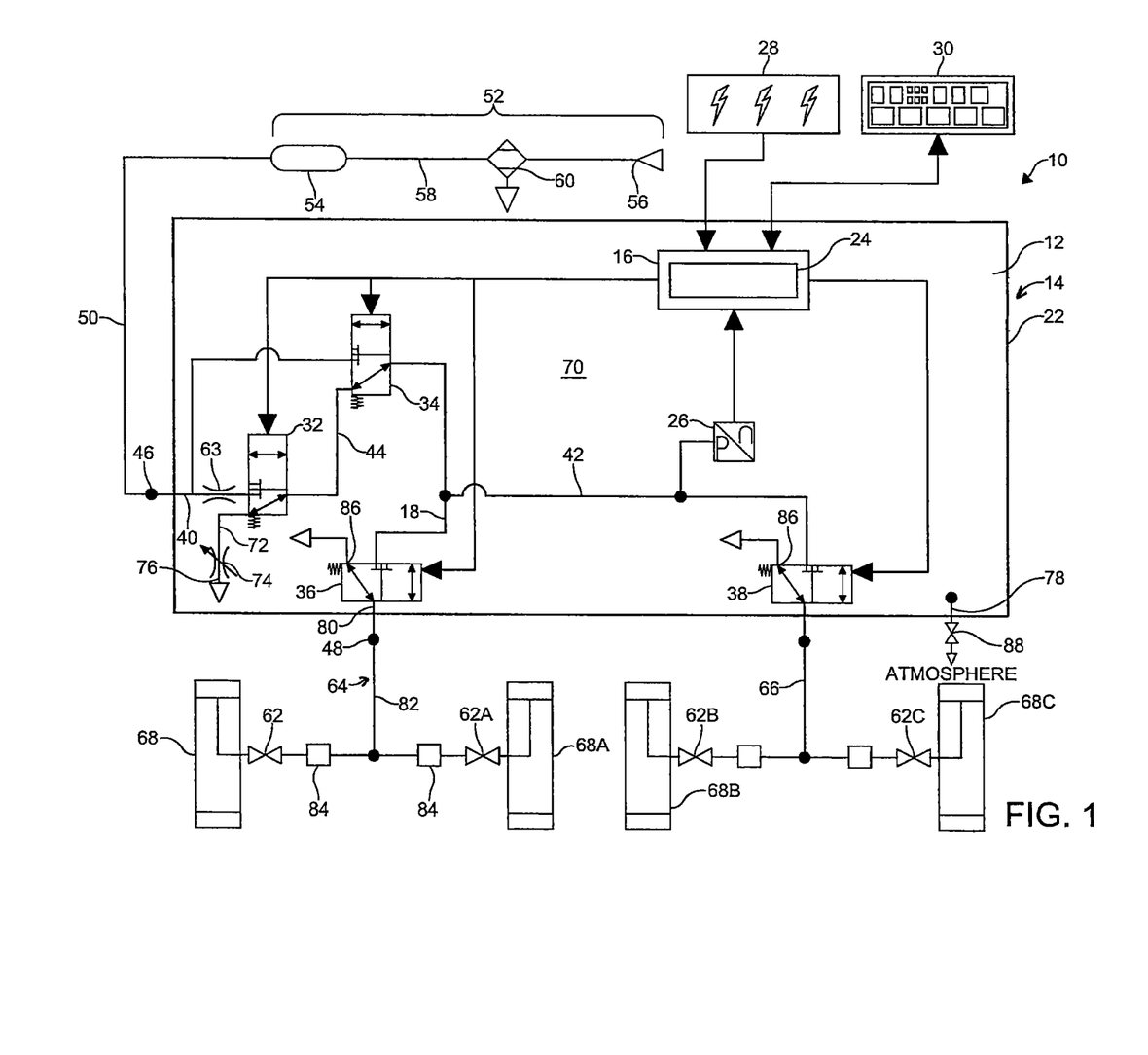
FIG. 1 is a schematic view of an embodiment of a tire pressure management system in accordance with the invention.
Figure 2:
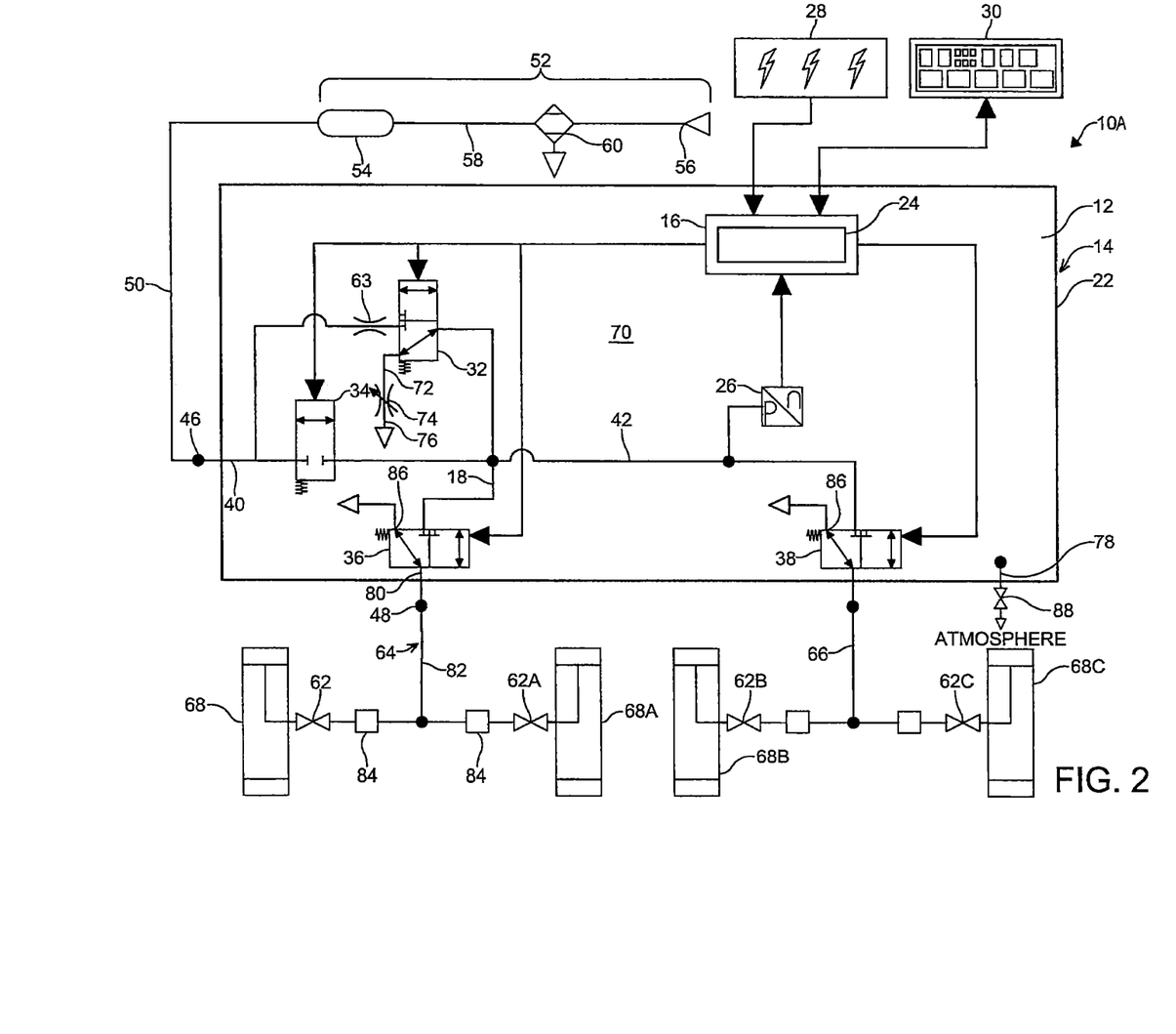
FIG. 2 is a schematic view of another embodiment of a tire pressure management system in accordance with the invention.

Embodiments of the tire pressure management system 10, 10A are illustrated in FIGS. 1 and 2. The tire pressure management system may be utilized to maintain, increase and/or decrease the tire pressure of one or more wheel assemblies. Maintaining, increasing and/or decreasing tire pressure is advantageous as it may improve the fuel economy and increase the life of the tires of the vehicle.

In certain embodiments, the tire pressure management system 10, 10A comprises a control unit 12. The control unit 12 is configured to enable determining the tire pressure of one or more wheel assemblies and, if needed, increasing or decreasing the tire pressure thereof. The control unit 12 is also configured to enable venting the air from of one or more portions of the tire pressure management system 10, 10A.

The control unit 12 comprises a housing 14. An electronic control portion 16 and a pneumatic control portion 18 are provided within the housing 14.

The electronic control portion 16 may include a microprocessor 24 operating under the control of a set of programming instructions, which may also be referred to as software. The electronic control portion 16 may include a memory (not depicted) in which programming instructions are stored. The memory can also store identification codes, tire pressure records and/or user inputs over a period of time.

The electronic control portion 16 may receive input signals from a pressure sensor 26, power supply 28 and one or more additional sensors (not depicted) such as, for example, a load sensor and a speed sensor. The load sensor and speed sensor may each be conventional in the art. The pressure sensor 26 may also be referred to as a pressure transducer and will be discussed in greater detail below. The electronic control portion 16 may also receive input signals from an operator control device 30.

The operator control device 30 may allow an operator of the vehicle to exert a certain level of control over the tire pressure management system 10, 10A. The operator control device 30 may be conventional in the art. The operator control device 30 permits an operator of the vehicle to transmit control signals to the electronic control portion 16 to adjust the tire pressure.

The electronic control portion 16 outputs signals to one or more members of the pneumatic control portion 18. Preferably, the electronic control portion 16 outputs signals to a plurality of valve assemblies 32, 34, 36, 38 of the pneumatic control portion 18. The output signals may be electrical current. Electrical current can be received by a valve assembly 32, 34, 36, 38 to energize the assembly. Similarly, electrical current can be removed from the valve assembly 32, 34, 36, 38 to de-energize the valve assembly. As will be discussed in more detail below, energizing and de-energizing a valve assembly 32, 34, 36, 38 urges the valve assembly 32, 34, 36, 38 from a first position to a second position or vice versa. The electronic control portion 16 may also output signals to a display device (not depicted). The display device may be included as a part of the operator control device 30 or a freestanding device.

The pneumatic control portion 18 may comprise one or more conduits 40, 42, 44 provided within the housing 14 and one or more ports 46, 48 formed in the housing 14. In an embodiment, an air supply port 46 is formed in the lower portion 22 of the housing 14. The air supply port 46 is in fluid communication with an air supply conduit 40 provided within the housing 14. Also, the air supply port 46 is in fluid communication with an air supply circuit 50.

The tire pressure management system 10, 10A includes a source of pressurized air 52. Pressurized air is supplied to control unit 12 from the source of pressurized air 52 via the air supply circuit 50. Preferably, the source of pressurized air 52 comprises a reservoir 54 such as, for example, a wet tank. Preferably, a compressor 56 is attached to the vehicle and in fluid communication with the wet tank via a supply conduit 58. The air compressor 56 supplies pressurized air to the wet tank for storage therein. In certain embodiments, a drier 60 is interposed in the air supply circuit 50 for removing water from the air. A filter (not depicted) may also be interposed in the air supply circuit 50.

The pressurized air may be utilized to determine the tire pressure and, if needed, open one or more wheel valves 62, 62A, 62B, 62C and increase the tire pressure. The pressurized air provided in the air supply circuit 50 and supplied from the source of pressurized air 52 comprises air at a certain pressure. The pressure sensor 26 measures the pressure of the pressurized air provided in the air supply circuit 50. It is preferred that the pressurized air provided in the air supply circuit 50 is at a pressure which is greater than the tire pressure. Preferably, the pressure of the pressurized air provided in the air supply circuit 50 is greater than the target tire pressure so that the tire pressure can, if needed, be increased to the target tire pressure. In an embodiment, the pressure of the air provided in the air supply circuit 50 is equal to the target tire pressure plus 5 psig or more.

The air supply conduit 40 is attached to and extends from the air supply port 46. The air supply conduit 40 is attached to and in fluid communication with the control valve assembly 32. Also, the air supply conduit 40 is attached to and in fluid communication with the supply valve assembly 34. Preferably, the control valve assembly 32 and the supply valve assembly 34 are provided within the housing 14.

In certain embodiments, the control valve assembly 32 and supply valve assembly 34 are of the solenoid variety. Preferably, in these embodiments, the control valve assembly is of the 3-way variety. In an embodiment, like the one illustrated in FIG. 1, the supply valve assembly 34 is also of the 3-way variety. However, in other embodiments, like the one illustrated in FIG. 2, the supply valve assembly 34 is of the two-way variety.

The control valve assembly 32 is operable from a first position through a second position. Also, the supply valve assembly 34 is operable from a first position through a second position. Preferably, the control valve assembly 32 and the supply valve assembly 34 are both normally in the first position. Preferably, when the control valve assembly 32 is de-energized, the valve assembly 32 is in or placed in the first position. Preferably, when the supply valve assembly 34 is de-energized, the valve assembly 34 is in or placed in the first position. Preferably, when the control valve assembly 32 is energized, the valve assembly 32 is in or placed in the second position. Also, it is preferred that when the supply valve assembly 34 is energized, the valve assembly 34 is in or placed in the second position.

The control valve assembly 32 is selectively in fluid communication with one or more wheel valve assemblies 62, 62A, 62B, 62C via one or more of the fluid control circuits 64, 66. As illustrated in FIGS. 1 and 2, an orifice 63 is provided in the air supply conduit 40 upstream of the control valve assembly 32. In other embodiments (not depicted), the orifice 63 may be provided downstream of the control valve assembly 32. In one such embodiment, the orifice may be provided downstream of the control valve assembly 32 and in the central fluid conduit 44. The orifice 63 and the control valve assembly 32 are utilized to communicate a small flow or bleed of pressurized air to the first fluid conduit 42 and/or one or more fluid control circuits 64, 66. The control valve assembly 32 may also be utilized to decrease the tire pressure of one or more wheel assemblies 68, 68A, 68B, 68C.

The supply valve assembly 34 is selectively in fluid communication with one or more wheel valve assemblies 62, 62A, 62B, 62C via one or more of the fluid control circuits 64, 66. The supply valve assembly 34 may be utilized to communicate pressurized air to the first fluid conduit 42 and/or one or more of the fluid control circuits 64, 66 to determine and/or increase the tire pressure of one or more wheel assemblies 68, 68A, 68B, 68C. For example, when the supply valve assembly is energized and/or in the second position, the supply valve assembly permits fluid communication between the source of pressurized air 52 and a fluid control circuit 64, 66. Alternatively, as illustrated by the embodiment depicted in FIG. 1, the supply valve assembly 34 may be utilized to direct pressurized air from one or more wheel assemblies 68, 68A, 68B, 68C to the control valve assembly 32 when the tire pressure of the one or more wheel assemblies 68, 68A, 68B, 68C is being decreased. In the embodiments illustrated in FIGS. 1 and 2, when the supply valve assembly 34 is de-energized and/or in the first position, the supply valve assembly 34 prohibits fluid communication between the source of pressurized air 52 and a fluid control circuit 64, 66.

When the control valve assembly 32 is energized and/or in the second position, the control valve assembly 32 permits fluid communication between the source of pressurized air 52 and one or more fluid control circuits 64, 66. In an embodiment, like the one illustrated in FIG. 1, the central fluid conduit 44 is in fluid communication with and attached on opposite ends to the control valve assembly 32 and the supply valve assembly 34. The central fluid conduit 44 is utilized to allow pressurized air to be communicated between the control valve assembly 32 and the supply valve assembly 34. For example, in the embodiment illustrated in FIG. 1, when the control valve assembly 32 is energized and/or in the second position and the supply valve assembly 34 is de-energized and/or in the first position, the source of pressurized air 52 is in fluid communication with the first fluid conduit 42 via the control valve assembly 32, central fluid conduit 44, and supply valve assembly 34. When in the second position, the control valve assembly 32 is utilized to communicate the bleed of air to the supply valve assembly 34, the first fluid conduit 42 and/or one or more fluid control circuits 64, 66. Alternatively, the central fluid conduit 44 can be configured to permit pressurized air to be directed to the control valve assembly 32. For example, when the control valve assembly 32 and the supply valve assembly 34 are both de-energized and/or in their respective first positions, pressurized air in the first fluid conduit 42 can be communicated from the supply valve assembly 34 to the control valve assembly 32 via the central fluid conduit 44. In other embodiments, like the one illustrated in FIG. 2, the first fluid conduit 42 is attached to and directly in fluid communication with the control valve assembly 32.

In the embodiments illustrated in FIGS. 1 and 2, when the control valve assembly 32 is de-energized and/or in the first position, the control valve assembly 32 prohibits fluid communication between the source of pressurized air 52 and a fluid control circuit 64, 66. However, when the control valve assembly is de-energized and/or in the first position, the control valve assembly 32 permits fluid communication between one or more fluid control circuits 64, 66 and the atmosphere. Preferably, when the control valve assembly 32 is de-energized and/or in the first position, the first fluid conduit 42 is in fluid communication with a chamber 70 provided in the control unit housing 14. When the first fluid conduit 42 is in fluid communication with the chamber 70 and if pressurized air is within the first fluid conduit 42, the pressurized air is directed to the chamber 70. Pressurized air may be directed to the chamber 70 when the tire pressure management system 10, 10A is being vented or when decreasing the tire pressure of one or more wheel assemblies 68, 68A, 68B, 68C. In the embodiment illustrated in FIG. 1, the first fluid conduit 42 is vented by directing pressurized air from the first fluid conduit 42 through the supply valve assembly 34, central fluid conduit 44, control valve assembly 32, deflate conduit 72 and deflate member 74 into the chamber 70 or directly to atmosphere. Similarly, when decreasing the tire pressure utilizing the tire pressure management system 10 illustrated in FIG. 1, pressurized air from one or more wheel assemblies 68, 68A, 68B, 68C is directed to the first fluid conduit 42 and, from the first fluid conduit 42, the pressurized air is directed through the supply valve assembly 34, central fluid conduit 44, control valve assembly 32, deflate conduit 72 and deflate member 74 into the chamber 70 or directly to atmosphere. In the embodiment illustrated in FIG. 2, the first fluid conduit 42 is vented by directing pressurized air from the first fluid conduit 42 through the control valve assembly 32, deflate conduit 72 and deflate member 74 into the chamber 70 or directly to atmosphere. Also, when decreasing the tire pressure utilizing the tire pressure management system 10A illustrated in FIG. 2, pressurized air from one or more wheel assemblies 68, 68A, 68B, 68C is directed to the first fluid conduit 42 and, from the first fluid conduit 42, the pressurized air is directed through the control valve assembly 32, deflate conduit 72 and deflate member 74 into the chamber 70 or directly to atmosphere.

The first fluid conduit 42 is attached to and directly in fluid communication with the supply valve assembly 34. Preferably, when the supply valve assembly 34 is energized and/or in the second position, the source of pressurized air 52 is in fluid communication with the first fluid conduit 42. Under these conditions, the supply valve assembly 34 is utilized to communicate a flow of pressurized air from the source of pressurized air 52 to the first fluid conduit 42. Thus, the supply valve assembly 34 may be utilized to promote air flow from the source of pressurized air 52 to the first fluid conduit 42. When de-energized and/or in the first position, the supply valve assembly 34 prohibits air flow from the source of pressurized air 52 to the first fluid conduit 42. Under these conditions and in an embodiment like the one illustrated in FIG. 1, the supply valve assembly 34 may be utilized to communicate a flow of pressurized air from the first fluid conduit 42 to the control valve assembly 32 or from the control valve assembly 32 to the first fluid conduit 42.

As noted above for the embodiment illustrated in FIG. 1, when the supply valve assembly 34 is de-energized and/or in the first position, the control valve assembly 32 and the supply valve assembly 34 are in fluid communication via the central fluid conduit 44. Also, as noted above, when the control valve assembly 32 and the supply valve assembly 34 are both de-energized and/or in their respective first positions and if pressurized air is in the first fluid conduit 42, the supply valve assembly 34 allows pressurized air to be directed from the first fluid conduit 42 to the control valve assembly 32 via the central fluid conduit 44. Additionally, as should be appreciated, in this embodiment if the control valve assembly 32 and the supply valve assembly 34 are both de-energized and/or in their respective first positions, the source of pressurized air 52 is not in fluid communication with the first fluid conduit 42.

The deflate conduit 72 is attached on an end the to the control valve assembly 32 and on an opposite end to the deflate member 74. Preferably, the deflate conduit 72 is provided within the housing 14. The deflate conduit 72 provides fluid communication between the control valve assembly 32 and the deflate member 74. The deflate conduit 72 directs pressurized air from the control valve assembly 32 to the deflate member 74. Thus, the deflate member 74 is in fluid communication with the control valve assembly 32. As such, in embodiments where the control valve assembly 32 is de-energized and/or in the first position, the deflate member 74 may be in fluid communication with the first fluid conduit 42.

The deflate member 74 is also in fluid communication with the atmosphere. Although the deflate member 74 is in fluid communication with the atmosphere, it is preferred that the deflate member 74 is provided within the housing 14. The deflate member 74 is utilized to decrease the tire pressure of one or more wheel assemblies 68, 68A, 68B, 68C. When tire pressure is being decreased, pressurized air from one or more wheel assemblies 68, 68A, 68B, 68C passes through the deflate member 74 to the atmosphere or to the atmosphere via the chamber 70 and a vent conduit 78.

The deflate member 74 comprises an opening 76. When tire pressure is being decreased, pressurized air from one or more wheel assemblies 68 passes through the opening 76 before being released to the atmosphere. The opening 76 includes a cross-sectional area which is of a size that can be selected to allow for a desired decrease in tire pressure within a predetermined period of time. In certain embodiments, the size of the cross-sectional area can be selected to provide a desired backpressure in the tire pressure management system 10, 10A. The backpressure provided is sufficient to maintain one or more wheel valves 62, 62A, 62B, 62C in an open position when the tire pressure of one or more wheel assemblies 68, 68A, 68B, 68C is being decreased. Preferably, the backpressure is provided in one or more of the fluid control circuits 64, 66. More preferably, the deflate member 74 is configured so that the pressure provided to maintain one or more wheel valves 62, 62A, 62B, 62C in an open position when a tire pressure is being decreased is predetermined.

The size of the cross-sectional area of the opening 76 can be fixed. However, it is preferred that the size of the cross-sectional area of the opening 76 can vary. Preferably, the opening 76 has a cross-sectional area that is of a circular shape. However, in other embodiments, the cross-sectional area of the opening 76 may be of another shape. When the size of the cross-sectional area is variable, the size of the cross-sectional area can increase or decrease to maintain a desired flow of pressurized air through the opening 76. In this embodiment, a valve member may be provided as a portion of the deflate member 74 and extend into and be movable within the opening 76 to vary the size of the cross-sectional area. When the deflate member 74 comprises a valve and the valve is within the opening 76, the cross-sectional area of the opening 76 may be of a ring shape. Varying the size of the cross-sectional area enables the flow of pressurized air through the opening 76 and the backpressure in the fluid control circuit 64, 66 to be controlled and maintained.

The pressure sensor 26 is in fluid communication with the first fluid conduit 42. The pressure sensor 26 measures the pressure of the air within the first fluid conduit 42. When the source of pressurized air 52 is in fluid communication with the first fluid conduit 42, the pressure sensor 26 can measure the pressure of the air from the source of pressurized air 52 by measuring the pressure of the air in the first fluid conduit 42. Also, during certain operations, the pressure sensor 26 may measure the tire pressure by measuring the pressure of the air in the first fluid conduit 42. Once the pressure of the air in the first fluid conduit 42 has been measured, the pressure sensor 26 can send a signal to the electronic control portion 16.

As described above and illustrated in FIG. 1, the first fluid conduit 42 is in fluid communication with the pressure sensor 26 and the supply valve assembly 34. Also, as described above, the first fluid conduit 42 is selectively in fluid communication with the chamber 70 via the control valve assembly 32. The first fluid conduit 42 is also attached to and in fluid communication with one or more additional valve assemblies 36, 38.

As illustrated in FIG. 1, in certain embodiments, the pneumatic control portion 18 comprises two channel valve assemblies 36, 38. In these embodiments, a steer axle channel valve assembly 36 and a drive axle channel valve assembly 38 are each attached to and in fluid communication with the first fluid conduit 42. Preferably, the steer axle channel valve assembly 36 and drive axle channel valve assembly 38 are of the solenoid variety. The steer axle channel valve assembly 36 and the drive axle channel valve assembly 38 are operable from a first position through a second position and provided within the housing 14. Also, it is preferred that the channel valve assemblies 36, 38 are of the 3-way variety. In this embodiment, each channel valve assembly 36, 38 is configured to permit fluid communication between the first fluid conduit 42 and a fluid control circuit 64, 66 or between a fluid control circuit 64, 66 and the atmosphere.

Preferably, the steer axle channel valve assembly 36 and the drive axle channel valve assembly 38 are each normally in the first position. Preferably, when a channel valve assembly 36, 38 is de-energized, the valve assembly 36, 38 is in the first position. Preferably, when a channel valve assembly 36, 38 is energized, the valve assembly 36, 38 is in the second position.

The steer axle channel valve assembly 36 is in fluid communication with one or more wheel valve assemblies 62, 62A via the first fluid control circuit 64. The steer axle channel valve assembly 36 separates the first fluid conduit 42 from the first fluid control circuit 64. When the steer axle channel valve assembly 36 is energized and/or in the second position, the first fluid conduit 42 is in fluid communication with the first fluid control circuit 64. Preferably, the first fluid control circuit 64 is selectively in fluid communication with one or more wheel assemblies 68, 68A provided on a steer axle (not depicted) of the vehicle. When the first fluid conduit 42 is in fluid communication with the first fluid control circuit 64, a flow of air from the source of pressurized air 52 can be directed to the wheel assemblies 68, 68A provided on the steer axle via the first fluid control circuit 64 and one or more wheel valves 62, 62A. Thus, the steer axle channel valve assembly 36 is utilized to promote air flow from the source of pressurized air 52 to one or more wheel assemblies 68, 68A. When the steer axle channel valve assembly 36 is de-energized and/or in the first position, the first fluid control circuit 64 is in fluid communication with the chamber 70. When the first fluid control circuit 64 is in fluid communication with the chamber 70 and if pressurized air is within the first fluid control circuit 64, venting the first fluid control circuit 64 occurs. The first fluid control circuit 64 is vented by directing a flow of pressurized air from the first fluid control circuit 64 through the steer axle channel valve assembly 36 into the chamber 70.

When the drive axle channel valve assembly 38 is energized and/or in the second position, the first fluid conduit 42 is in fluid communication with the second fluid control circuit 66. Preferably, the second fluid control circuit 66 is selectively in fluid communication with one or more wheel assemblies 68B, 68C provided on a drive axle (not depicted) of the vehicle. When the first fluid conduit 42 is in fluid communication with the second fluid control circuit 66, a flow of air from the source of pressurized air can be directed to one or more wheel assemblies 68B, 68C provided on the drive axle via the second fluid control circuit 66 and one or more wheel valves 62B, 62C. Thus, the drive axle channel valve assembly 38 is utilized to promote air flow from the source of pressurized air 52 to one or more wheel assemblies 68B, 68C. When the drive axle channel valve assembly 38 is de-energized and/or in the first position, the second fluid control circuit 66 is in fluid communication with the chamber 70. When the second fluid control circuit 66 is in fluid communication with the chamber 70 and if pressurized air is within the second fluid control circuit 66, venting the second fluid control circuit 66 occurs. The second fluid control circuit 66 is vented by directing a flow of pressurized air from the second fluid control circuit 66 through the drive axle channel valve assembly 38 into the chamber 70.

The first fluid control circuit 64 and the second fluid control circuit 66 are similarly configured. Thus, only certain members of the first fluid control circuit 64 will be described in more detail below. It should be appreciated that as the first fluid control circuit 64 and the second fluid control circuit 66 are similarly configured, the tire pressure management system 10, 10A can utilize the fluid control circuits 64, 66 in similar fashions. For example, as described above, each fluid control circuit 64, 66 can be utilized to provide fluid communication between one or more wheel assemblies 68, 68A, 68B, 68C and portions of the control unit 12. Also, as described above, both the first fluid control circuit 64 and the second fluid control circuit 66 may be vented, either separately or simultaneously. Thus, certain operations of the tire pressure management system 10, 10A will only be described with respect to the first fluid control circuit 64. It should be appreciated that the tire pressure management system 10, 10A is not limited to utilizing only the first fluid control circuit 64 as described below in performing one or more of the operations described herein.

The first fluid control circuit 64 comprises a fluid conduit 80 and the channel port 48. The fluid conduit 80 is preferably provided in the housing 14 and is attached to and in fluid communication with the steer axle channel valve assembly 36 on an end. On another end, the fluid conduit 80 is attached to and in fluid communication with the channel port 48. The fluid control circuit 64 may also comprise one or more additional fluid conduits 82, a rotary seal assembly 84 and/or a hose assembly (not depicted).

The first fluid control circuit 64 is in fluid communication with one or more wheel valves 62, 62A. Preferably, each wheel valve 62, 62A is similarly configured and operates in a similar fashion. As such, the configuration and operation of only one wheel valve 62 will be described below.

The wheel valve 62 is attached to and in fluid communication with the wheel assembly 68. Preferably, the wheel valve 62 is a control valve. More preferably, the wheel valve is a bi-directional control valve. As should be appreciated, the term bi-directional control valve means that pressurized air flows to the wheel assembly 68 through the wheel valve 62 when the tire pressure is being increased and flows from the wheel assembly 68 through the wheel valve 62 when the tire pressure is being decreased.

In an embodiment, the wheel valve 62 is as described in WO 2014/028142 A1, the entire disclosure of which is hereby incorporated by reference. In another embodiment, the wheel valve 62 is as described in U.S. provisional patent application No. 62/281,896, the entire disclosure of which is hereby incorporated by reference. The wheel valve 62 separates the fluid control circuit 64 from the wheel assembly 68 and is utilized to retain pressurized air therein. Also, the wheel valve 62 allows the wheel assembly 68 to selectively communicate with the control unit 12 and portions thereof via the first fluid control circuit 64. The wheel valve 62 is operable from an open position to a closed position. In an open position, pressurized air flows to the wheel assembly 68 through the wheel valve 62 when the tire pressure is being increased and flows from the wheel assembly 68 through the wheel valve 62 when the tire pressure is being decreased. Thus, in an open position, the wheel valve 62 permits the tire pressure to be measured, increased, or decreased. In the closed position, the wheel valve 62 prohibits pressurized air from being removed from or being added to the wheel assembly 68.

The pressurized air housed within the wheel assembly 68 is referred to herein as "tire pressure." Tire pressure is increased by adding pressurized air into the wheel assembly 68 and decreased by removing air from the wheel assembly 68. Preferably, the tire pressure is equal to a target tire pressure. The target tire pressure can be selected by an operator of the vehicle to be a desired pressure. After the target tire pressure is selected, it can be programmed into the control unit 12 via the electronic control portion 16. The target tire pressure can also be pre-programmed into the control unit 12. To ascertain if the tire pressure is equal to the target tire pressure, the tire pressure is measured. As noted above, the control unit 12 is configured to enable measuring the tire pressure.

If it is determined that the tire pressure is less than the target tire pressure, the tire pressure can be increased. If it is determined that the tire pressure is greater than the target tire pressure, the tire pressure can be decreased. After the tire pressure has been increased and/or decreased, the tire pressure can be measured again as needed. Also, if the tire pressure is equal to the target tire pressure, the tire pressure can be measured again at a later time.

As noted above, the tire pressure is increased by adding pressurized air into the wheel assembly 68, 68A, 68B, 68C. The tire pressure of a plurality of wheel assemblies 68, 68A, 68B, 68C can be increased to the target tire pressure. Also, it should be appreciated that the tire pressure can be increased for the wheel assemblies 68, 68A, 68B, 68C of the steer axle or drive axle. However, due to differences in the preferred target tire pressures of the wheel assemblies 68, 68A, 68B, 68C of the steer axle and drive axle, it is preferred that the tire pressures of the wheel assemblies 68, 68A, 68B, 68C of the aforementioned axles be increased separately.

When the tire pressure is to be measured, increased, or decreased, the wheel valve 62 is urged to an open position. It should be appreciated that the wheel valve 62 may be urged to an open position utilizing a variety of methods. Preferably, the wheel valve 62 is urged to an open position utilizing one or more pulses of pressurized air. In certain embodiments, the supply valve assembly 34 is energized and de-energized one or more times in a predetermined period of time to provide one or more pulses of air to open the wheel valve 62. As should be appreciated, energizing the supply valve assembly 34 places the valve assembly into the second position and permits fluid communication between the air supply conduit 40 and the first fluid control circuit 64. It should also be appreciated that in the embodiments illustrated, the steer axle channel valve assembly 36 is also energized and/or in the second position to permit fluid communication between the air supply conduit 40 and the first fluid control circuit 64. The control valve assembly 32 is energized and/or in the second position when the one or more pulses of pressurized air are being provided. In these embodiments, each pulse of air may be provided for a predetermined period of time. The predetermined period of time that each pulse of air is provided for may be of the same duration. Alternatively, each pulse of air may be provided for a predetermined period of time that is of a longer duration or a shorter duration than the predetermined period of time for a previous or subsequent pulse of air. Once the wheel valve 62 is open, the tire pressure can be measured utilizing the pressure sensor 26. The wheel valve 62 may also be urged to the closed position when desired such as, for example, when the tire pressure has been increased to the target tire pressure.

Once the wheel valve 62 is in the open position, the tire pressure can be increased by any number of methods. For example, the tire pressure can be increased by utilizing one or more pulses of pressurized air to add pressurized air to the wheel assembly 68. A pulse of air can be provided as described above utilizing one or more pulses of pressurized air to increase the tire pressure helps to prevent over-inflation of the wheel assembly 68.

Once open, the wheel valve 62 can be maintained in the open position for one or more predetermined periods of time to increase the tire pressure to the target tire pressure. The wheel valve 62 can be maintained in the open position utilizing the bleed air. After the tire pressure has been increased to the target tire pressure, the wheel valve 62 is urged to the closed position when the channel valve assembly 36 is moved to the first position and/or de-energized.

Alternatively, once the wheel valve 62 is in the open position, the tire pressure can be decreased. Decreasing the tire pressure will be described primarily with reference to the tire pressure of one wheel assembly 68. However, the method is suitable for use in decreasing the tire pressure of one or more wheel assemblies simultaneously. Additionally, the method of decreasing tire pressure will be described for use with the first fluid control circuit 64. However, it should be appreciated that the method can be utilized with the second fluid control circuit 66.

When decreasing the tire pressure, the control valve assembly 32 and the supply valve assembly 34 are de-energized and/or moved to their respective first positions. In the embodiment illustrated in FIG. 1 and in the condition mentioned above, the valve assemblies 32, 34 are in fluid communication with each other via the central fluid conduit 44. Also, when the tire pressure is being decreased, the steer axle channel valve assembly 36 is energized and/or in the second position. With the wheel valve 62 in the open position and the valve assemblies 32, 34, 36 as described, a stream of pressurized air is directed from the wheel assembly 68 through the wheel valve 62, fluid control circuit 64, steer axle channel valve assembly 36, first fluid conduit 42, supply valve assembly 34, central fluid conduit 44, control valve assembly 32 and the deflate conduit 72 to the deflate member 74. Alternatively, as illustrated in the embodiment depicted in FIG. 2, the stream of pressurized air is directed from the wheel assembly 68 through the wheel valve 62, fluid control circuit 64, steer axle channel valve assembly 36, first fluid conduit 42, control valve assembly 32 and the deflate conduit 72 to the deflate member 74. From the deflate member 74, the stream of pressurized air is directed directly to the atmosphere or the chamber 70 to decrease the tire pressure. Thus, when the tire pressure is being decreased, the deflate member 74 is in fluid communication with the wheel valve 62 via the fluid control circuit 64. Under the conditions described above, the deflate member 74 is in fluid communication with the fluid control circuit 64 if the steer axle channel valve assembly 36 is energized and/or in the second position.

The flow of pressurized air from the wheel assembly 68 through deflate member 74 can be controlled so that if a particular backpressure is required in the fluid control circuit 64 to maintain the wheel valve 62 in the open position, then the backpressure required can be provided. The wheel valve 62 can be maintained in the open position as the tire pressure is decreased. As pressurized air is being removed from the wheel assembly 68, the pressure sensor 26 can measure a pressure of the air in the first fluid conduit 42 and provide a signal which corresponds to the tire pressure. If the tire pressure measured by the pressure sensor 26 is greater than the target tire pressure, the tire pressure can be decreased until the tire pressure is equal to the target tire pressure.

In an embodiment, the method comprises decreasing a plurality of tire pressures simultaneously. In this embodiment, the tire pressures may be equalized before being decreased simultaneously. Preferably, the tire pressures are equalized by decreasing the tire pressure of the wheel assembly having the highest tire pressure so that the tire pressure is equal to or about equal to the tire pressure of the wheel assembly having the lowest tire pressure. The step of decreasing the tire pressure of the wheel assembly having the highest tire pressure to be equal to or about equal to the tire pressure of the wheel assembly having the lowest tire pressure can be repeated as required until the tire pressures of the wheel assemblies are equal to each other. Once the tire pressures to be decreased are equal or about equal, the tire pressures can be decreased by opening the appropriate wheel valves simultaneously as described above and directing streams of air from the wheel assemblies 68 to the deflate member 74.

If the pressure sensor 26 measures a pressure in the first fluid conduit 42 indicative of the tire pressure which is equal to the target tire pressure, decreasing the tire pressure is completed. Once decreasing the tire pressure is complete, the steer axle channel valve assembly 36 is de-energized and/or placed in the first position. As described above, placing the steer axle channel valve assembly 36 in the first position and/or de-energizing the valve assembly 36 urges the wheel valve 62 to the closed position. With the wheel valve 62 in the closed position, further decreases in tire pressure are prevented as additional air is prevented from being removed from the wheel assembly 68.

In certain embodiments, the tire pressure is measured and is determined to be equal to the target tire pressure. Once the tire pressure is equal to the target tire pressure, increasing or decreasing the tire pressure is not desired. In these embodiments, the system 10, 10A may be vented. Preferably, the tire pressure management system 10, 10A is vented by removing pressurized air one or more portions of the system. For example, it is preferably that any pressurized air within the first fluid conduit 42, the first fluid control circuit 64 and the second fluid control circuit 66 is removed once the tire pressure is equal to the target tire pressure. Additionally, the system 10, 10A may be vented if communication or power is lost to the system 10, 10A.

As described above, pressurized air from the first fluid conduit 42, the first fluid control circuit 64 and/or the second fluid control circuit 66 can be directed to the chamber 70 via the control valve assembly 32, steer axle channel valve assembly 36 and drive axle channel valve assembly 38, respectively. When it is desired to vent the tire pressure management system 10, 10A, the control valve assembly 32, supply valve assembly 34, steer axle channel valve assembly 36 and drive axle channel valve assembly 38 are in or placed in their respective first positions by de-energizing the valve assemblies 32, 34, 36, 38. When the aforementioned valve assemblies 32, 34, 36, 38 are de-energized, venting the first fluid conduit 42, the first fluid control circuit 64 and the second fluid control circuit 66 is enabled. If pressurized air is within the first fluid conduit 42, the first fluid control circuit 64 and the second fluid control circuit 66, the pressurized air is directed to the chamber 70 via the control valve assembly 32, steer axle channel valve assembly 36 and drive axle channel valve assembly 38, respectively. Preferably, pressurized air from the first fluid control circuit 64 and the second fluid control circuit 66 is directed into chamber 70 from the steer axle channel valve assembly 36 and drive axle channel valve assembly 38 from an opening 86 provided in each valve assembly 36, 38. Pressurized air from the first fluid conduit 42 is directed into chamber 70 from the control valve assembly 32 via the deflate member 74. As illustrated in the embodiment shown in FIG. 1, prior to being directed into the chamber 70 from the control valve assembly 32, the pressurized air may be directed to the control valve assembly 32 via the central fluid conduit 44 and supply valve assembly 34.

As noted above, the chamber 70 is provided within the housing 14 and may be in fluid communication with the atmosphere via the vent conduit 78. When provided, the vent conduit 78 extends from the chamber 70 to an outer surface of the housing 14. After pressurized air is received from the first fluid conduit 42, the first fluid control circuit 64 and/or the second fluid control circuit 66, the vent conduit 78 directs the pressurized air in the chamber 70 to the atmosphere. Preferably, the vent conduit 78 is formed in the lower portion 22 of the housing 14 and extends in a downward direction. Forming the passage 66 in the lower portion 22 of the housing 14 and to extend in a downward direction helps to prevent dirt and debris from entering the housing 14.

In certain embodiments, a valve 88 may be positioned in the vent conduit 78. Preferably, the valve 88 is of the check valve variety. The valve 88 may be formed of rubber or another elastomeric material. In these embodiments, the valve 88 allows pressurized air in the chamber 70 to be discharged to the atmosphere and prevents air from the atmosphere from entering the chamber via the vent conduit 78. Thus, the valve 88 helps to prevent dirt and debris from entering the housing 14 via the vent conduit 78. To determine when venting of the aforementioned portions of the tire pressure management system 10, 10A has been completed, the pressure sensor 26 measures the pressure of the air in the first fluid conduit 42.

From the foregoing detailed description, it will be apparent that various modifications, additions, and other alternative embodiments are possible without departing from the true scope and spirit. The embodiments discussed herein were chosen and described to provide the best illustration of the principles of the invention and its practical application to thereby enable one of ordinary skill in the art to use the invention in various embodiments and with various modifications as are suited to the particular use contemplated. As should be appreciated, all such modifications and variations are within the scope of the invention.

The invention claimed is:

1. A tire pressure management system, comprising:
  a wheel valve in fluid communication with a wheel assembly;
  a supply valve assembly selectively in fluid communication with the wheel valve through a fluid control circuit, the supply valve assembly permitting fluid communication between a source of pressurized air and the fluid control circuit; and
  a control valve assembly selectively in fluid communication with the wheel valve through the fluid control circuit, the control valve assembly permitting fluid communication between the source of pressurized air and the fluid control circuit or between the fluid control circuit and atmosphere.

2. The tire pressure management system of claim 1, further comprising a deflate member in fluid communication with the control valve assembly through a deflate conduit.

3. The tire pressure management system of claim 1, further comprising a channel valve assembly which is in fluid communication with the wheel valve through the fluid control circuit and separates the fluid control circuit from a first fluid conduit.

4. The tire pressure management system of claim 1, further comprising a central fluid conduit in fluid communication with the supply valve assembly on an end and the control valve assembly on another end, the central fluid conduit being configured to permit pressurized air to be directed to the control valve assembly when the supply valve assembly is de-energized.

5. The tire pressure management system of claim 2, wherein the deflate member is in fluid communication with the wheel valve when the control valve assembly and the supply valve assembly are both de-energized and a channel valve assembly is energized.

6. The tire pressure management system of claim 2, wherein the deflate member is in fluid communication with a first fluid conduit when the control valve assembly is de-energized.

7. The tire pressure management system of claim 2, wherein the deflate member comprises an opening which has a cross-sectional area.

8. The tire pressure management system of claim 2, wherein the deflate member is in fluid communication with atmosphere and configured so that a predetermined pressure is provided in the fluid control circuit, wherein the predetermined pressure is sufficient to maintain the wheel valve in an open position.

9. The tire pressure management system of claim 2, wherein the supply valve assembly, control valve assembly, deflate conduit and deflate member are provided within a housing and the deflate member is in fluid communication with atmosphere through a chamber provided within the housing.

10. The tire pressure management system of claim 3, wherein the first fluid conduit is attached to and in fluid communication with the supply valve assembly.

11. The tire pressure management system of claim 3, wherein the channel valve assembly permits fluid communication between the fluid control circuit and the first fluid conduit or between the fluid control circuit and atmosphere.

12. The tire pressure management system of claim 3, further comprising a pressure sensor in fluid communication with the first fluid conduit.

13. The tire pressure management system of claim 6, wherein the deflate member is in fluid communication with the wheel valve through the fluid control circuit when a channel valve assembly is energized.

14. The tire pressure management system of claim 7, wherein the deflate member comprises a valve which is moveable within the opening to control the flow of pressurized air therethrough.

15. The tire pressure management system of claim 7, wherein the cross-sectional area of the opening varies in size to maintain a predetermined pressure in the fluid control circuit, wherein the predetermined pressure is sufficient to maintain the wheel valve in an open position when the tire pressure is being decreased.

16. The tire pressure management system of claim 10, wherein the first fluid conduit is attached to and in fluid communication with the control valve assembly.

17. The tire pressure management system of claim 14, wherein when the valve is disposed within the opening.

18. A method for decreasing tire pressure, comprising:
providing a wheel assembly that houses pressurized air;
providing a wheel valve that is in fluid communication with the wheel assembly, the wheel valve being operable from an open position to a closed position;
providing a supply valve assembly which is selectively in fluid communication with the wheel valve through a fluid control circuit;
providing a control valve assembly which is selectively in fluid communication with the wheel valve through the fluid control circuit;
providing a deflate member which is in fluid communication with the control valve assembly and selectively in fluid communication with the wheel valve; and
selecting a target tire pressure;
wherein if a pressure of the pressurized air in the wheel assembly is greater than the target tire pressure, then decreasing the pressure of the pressurized air in the wheel assembly by directing a flow of pressurized air from the wheel assembly through the wheel valve, control valve assembly, and deflate member.

19. The method for decreasing tire pressure of claim 18, further comprising providing a channel valve assembly which is in fluid communication with the wheel valve through the fluid control circuit, the channel valve assembly permitting fluid communication between the fluid control circuit and a first fluid conduit or between the fluid control circuit and atmosphere, wherein the flow of pressurized air is directed to the deflate member when the control valve assembly is de-energized and channel valve assembly is energized.

20. The method for decreasing tire pressure of claim 19, further comprising de-energizing the supply valve assembly.

* * * * *